Dec. 8, 1959 J. W. LUCAS 2,916,605
THREE O'CLOCK WELDING APPARATUS
Filed Jan. 29, 1958 6 Sheets-Sheet 1

INVENTOR.
JOHN W. LUCAS
BY
ATTORNEYS.

Dec. 8, 1959  J. W. LUCAS  2,916,605
THREE O'CLOCK WELDING APPARATUS
Filed Jan. 29, 1958  6 Sheets-Sheet 2

INVENTOR.
JOHN W. LUCAS
BY
ATTORNEYS.

Dec. 8, 1959 J. W. LUCAS 2,916,605
THREE O'CLOCK WELDING APPARATUS
Filed Jan. 29, 1958 6 Sheets-Sheet 3

INVENTOR.
JOHN W. LUCAS
BY Lyon & Lyon
ATTORNEYS.

Dec. 8, 1959  J. W. LUCAS  2,916,605
THREE O'CLOCK WELDING APPARATUS
Filed Jan. 29, 1958  6 Sheets-Sheet 4

INVENTOR.
JOHN W. LUCAS
BY
*Lyon & Lyon*
ATTORNEYS.

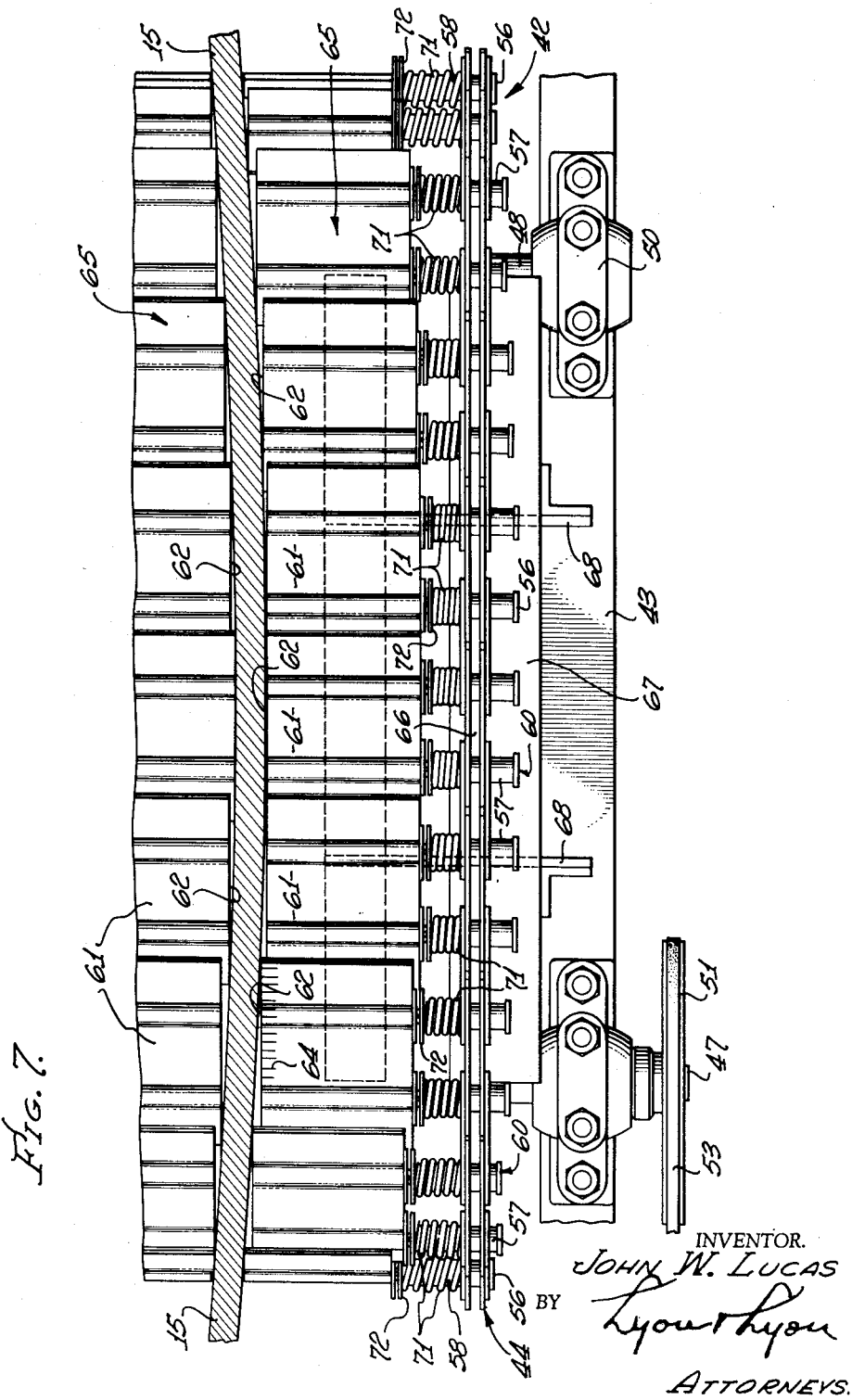

Dec. 8, 1959   J. W. LUCAS   2,916,605
THREE O'CLOCK WELDING APPARATUS
Filed Jan. 29, 1958   6 Sheets-Sheet 6
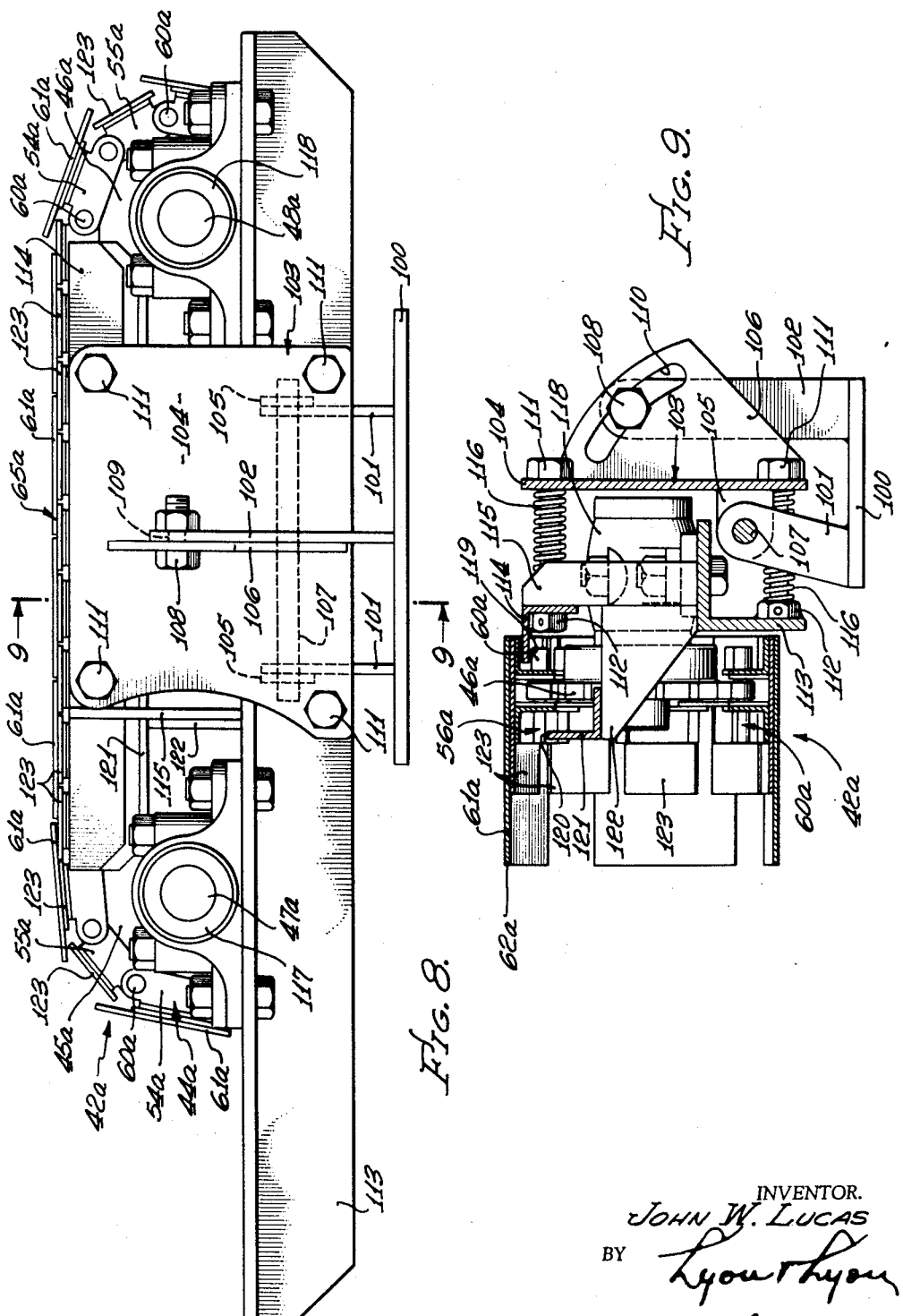
INVENTOR.
JOHN W. LUCAS
BY
ATTORNEYS.

ved Dec. 8, 1959

United States Patent Office 2,916,605
Patented Dec. 8, 1959

2,916,605

THREE O'CLOCK WELDING APPARATUS

John W. Lucas, San Marino, Calif., assignor, by mesne assignments, to Yuba Consolidated Industries, Inc., San Francisco, Calif.

Application January 29, 1958, Serial No. 711,987

13 Claims. (Cl. 219—126)

This invention relates to welding apparatus and is particularly directed to improvements in apparatus for joining vertical plates along horizontal seams by submerged arc welding. Apparatus of this type is known in the art as "Three o'clock welding apparatus."

Devices now in use for field erection of liquid storage tanks, for example, commonly employ a carriage or roller frame which travels under power along vertically extending curved plates and which support submerged arc welding apparatus for joining the plates along horizontal seams. In order that the electric arc which extends from the end of the consumable electrode to the seam be "submerged" in welding flux at all times, it is necessary to provide a device to support a layer of granular flux material against the seam to be welded. It is an important object of this invention to provide an improved form of flux support device.

Flux support belts of various types have been employed but they are often unsatisfactory and tend to give trouble in service. It is desirable that the layer of granular flux material be stationary or substantially so with respect to the plates and to the horizontal seam. The molten metal of the weld then solidifies under the flux blanket with a minimum of disturbance. This requirement does not mean that the flux blanket must remain absolutely stationary; on the contrary, a small amount of relatively slow movement of the flux blanket relative to the plates is not harmful and may actually be beneficial. Prior art flux supporting devices attempt to maintain the flux support belt stationary with respect to the plates by reason of friction contact between the belt and one of the plates. While in theory this should produce a stationary flux blanket for the weld metal of the seam, in practice the belt action tends to be nonuniform, with some jerkiness because the movement of the belt is not steady due to irregularities of the plate. Moreover, the curvature of the plates makes it difficult to maintain proper contact between the lower plate and the entire length of the flux-supporting run of the belt.

In accordance with my invention, these difficulties are overcome by providing a positive drive from a variable speed motor so that the flux support device has uniform action, and by providing a novel form of flux support device embodying a series of belt segments which are mounted for lateral movement on an endless flexible element, for example, an endless chain. In a typical embodiment of the invention belt segments are slidably mounted on adjacent pairs of chain link pins and springs are provided to urge the belt segments individually into contact with the lower plate below the horizontal seam. the upper run of the chain extends in the same general direction as the horizontal seam. The belt segments have overlapping side edges to provide a stable flux support platform and the mounting of the belt segments which permits individual movement affords optimum contact with the curved plate. The movement of the belt segments relative to the plate minimizes burning and disintegration of the belt segment material.

In the drawings:

Figure 7 is a plan view, partly in section showing the flux supporting device.

Figure 8 is a side elevation showing a modification.

Figure 9 is a sectional view taken substantially upon lines 9—9 as shown in Figure 8.

Figure 1:
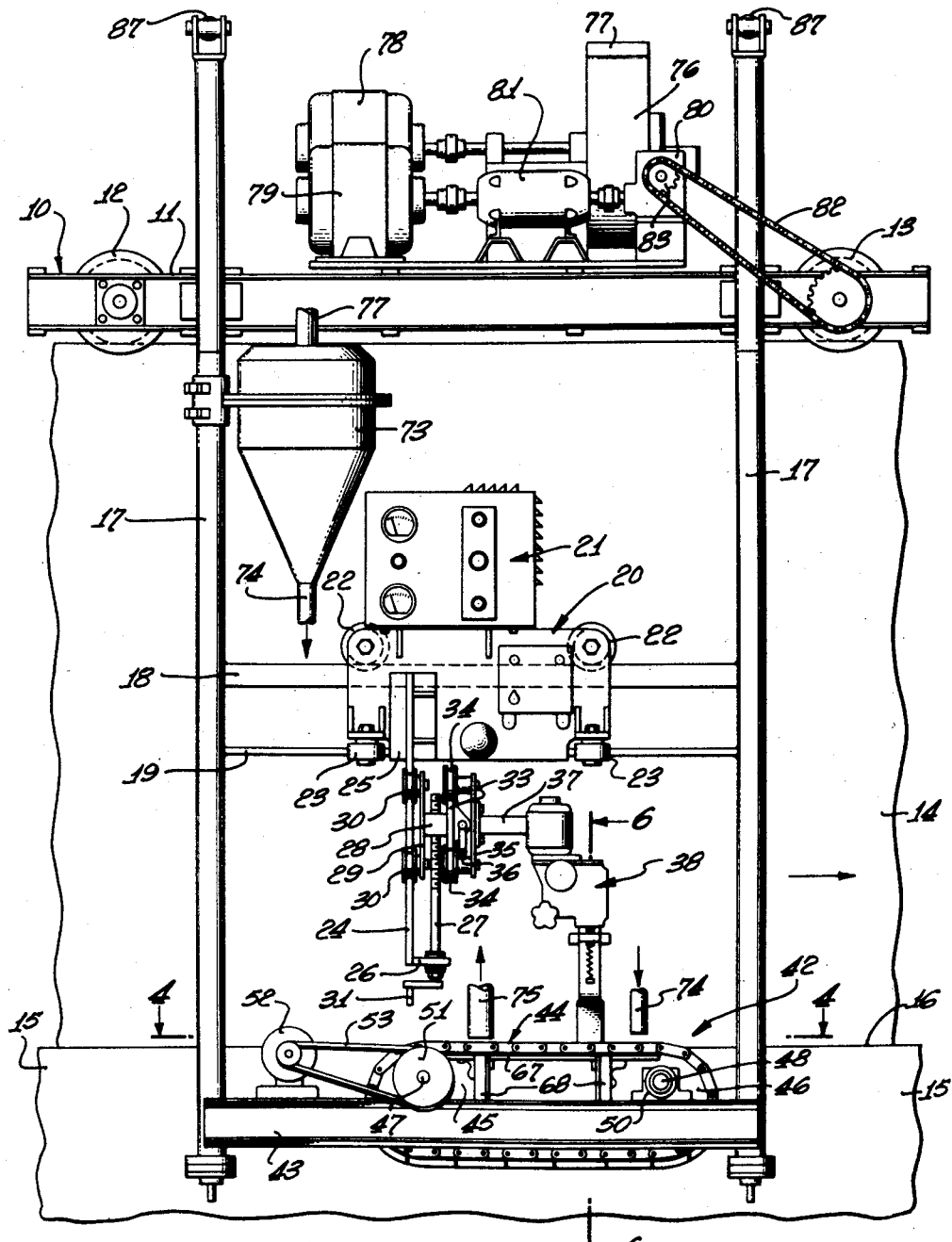
Figure 1 is a side elevation showing three o'clock welding apparatus in position on a large diameter tank constructed of steel plates.
Figure 2:
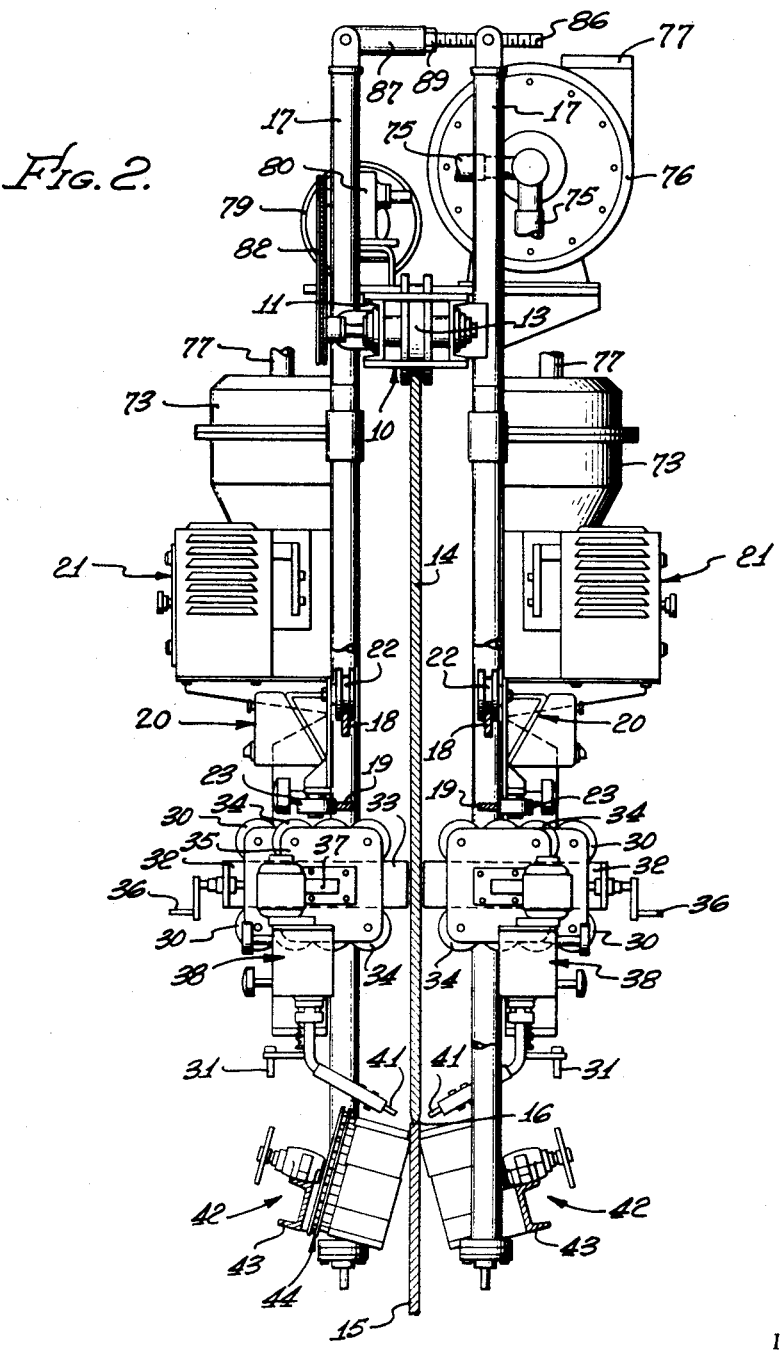
Figure 2 is an end elevation, the plates being shown in vertical section.
Figures 3, 4:
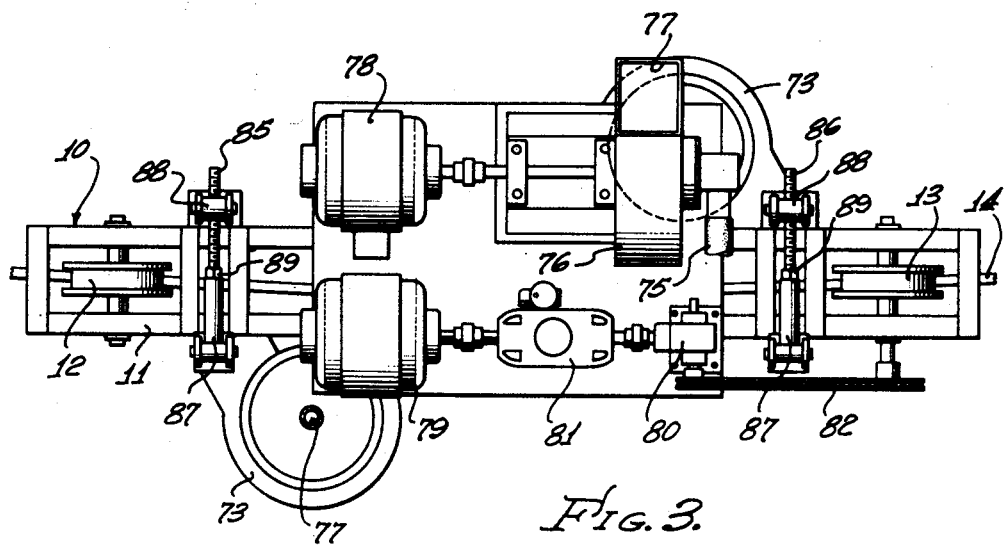
Figure 3 is a plan view thereof.
Figure 4 is a plan view taken in the direction of lines 4—4 as shown in Figure 1.
Figure 5:
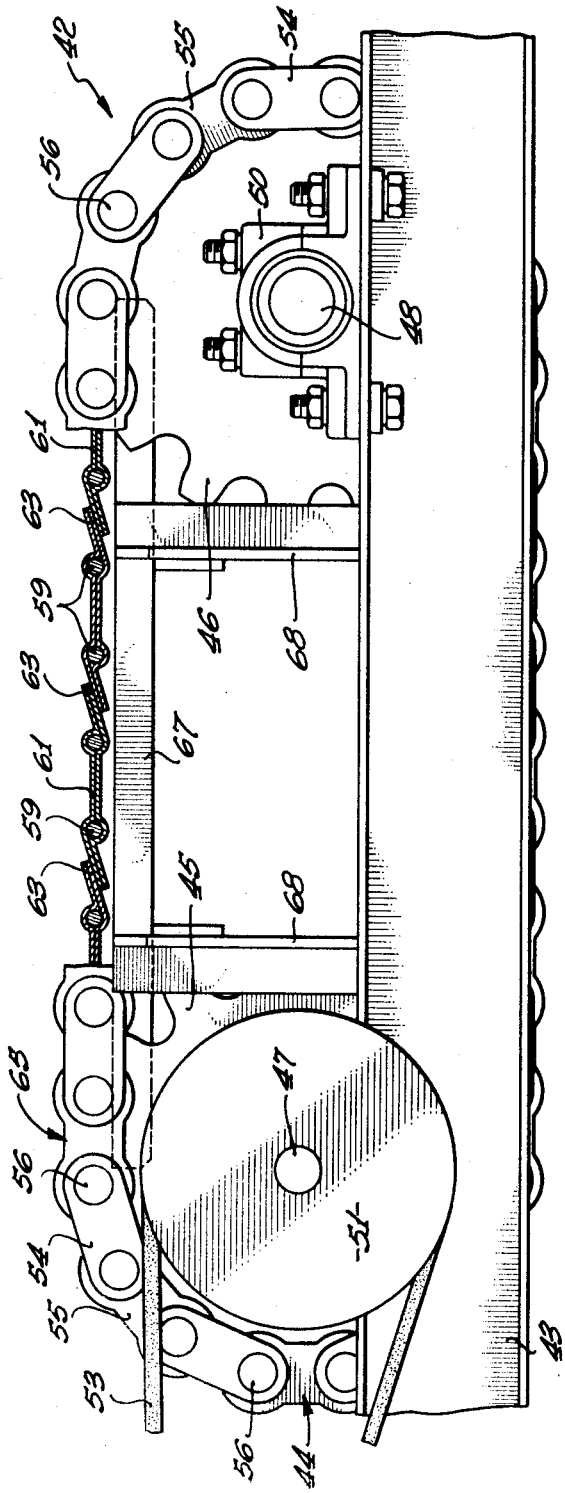
Figure 5 is a side elevation partly in section showing the flux support device, and taken in the direction 5—5 as shown on Figure 4.

Referring to the drawings, the carriage or rolling frame generally designated 10 includes a platform 11 having supporting wheels 12 and 13 rotatably mounted at opposite ends thereof. These supporting wheels are centrally grooved and roll on the upper horizontal edge of a series of plates 14. The plates 14 rest on and are supported by plates 15 and the abutting edges of the plates are bevelled in conventional manners to form a horizontal seam 16 to be welded. Pairs of columns 17 are mounted on each side of the plate 14 and extend downward from the platform 11. Welding devices are mounted on each side of the plate 14 and supported on the columns 17 in order that both sides of the seam 16 may be welded simultaneously. One of the welding devices ordinarily leads the other. Since the welding devices are duplicates only one need be described.

Parallel horizontal rails 18 and 19 extend between vertical columns 17 and support a rolling cross head 20 which carries arc welding equipment generally designated 21. The cross head is provided with rollers 22 and 23 which engage the rails 18 and 19 respectively. A vertical guide bar 24 is provided with a bracket 25 at its upper end and this bracket is fixed to the cross head 20. The bracket 26 fixed to the lower end of the bar 24 provides a bearing for the vertical adjusting screw 27. A block 28 is provided with internal threads to receive the adjusting screw 27 and this block is fixed to the plate 29. Grooved rollers 30 are mounted on the plate 29 and engage the edges of the guide bar 24. The manually operable crank 31 fixed on the lower end of the adjusting screw 27 affords the means of raising and lowering the block 28 and plate 29. An extension 32 on the block 28 has running clearance with the side surface of the vertical plate 14. Block 28 carries a horizontal guide bar 33 having parallel upper and lower edges engaged by grooved rollers 34. These rollers are mounted on a support plate 35 and the plate is caused to move horizontally along the guide bar 33 by means of manually operated crank 36. A bracket 37 fixed to the support plate 35 carries the motor driven welding head generally designated 38 of conventional design.

The function of the welding head 38 is to feed a consumable wire electrode 41 from a storage reel not shown, toward the seam 16 to be welded. The rate of feeding of the electrode 41 may be regulated in any conventional manner. In order that the end of the electrode 41 may be submerged in a layer of flux I provide a novel form of flux support device, generally designated 42. This device 42 includes a beam 43 which extends between the vertical columns 17 and the lower ends thereof. An endless chain 44 is trained over sprockets 45 and 46 and these sprockets are supported on shafts 47 and 48 mounted in bearings 49 and 50. A drive pulley 51 fixed to the shaft 47 is driven from variable speed motor 52 by the belt 53. The motor 52 and bearings 49 and 50 are mounted on the beam 43.

The links 54 and 55 of the endless chain 44 are connected by parallel pins 60 and these pins extend laterally from the links in a direction toward the plate 15. Each pin has an enlarged head 56, a cylindrical portion 57 which receives the aligned openings in the links 54 and 55, a central portion 58 and a projecting tip 59. The projecting tips on pairs of adjacent pins extend into and support a belt segment 61 formed of flexible heat-resisting material. Each belt segment 61 has an end edge 62 adapted to contact the plate 14 just below the seam 16. Side edges of adjacent belt segments overlap as shown at 63. The end edge 62 may be serrated as shown at 64 for optimum contact with the plate 14.

The upper run 65 of the chain 44 extends in the general direction of the seam 16 and the chain links in the upper run are guided in a groove 66 provided in a stationary guide bar 67 extending between the sprockets 45 and 46. This guide bar 67 is supported on the beam 43 by means of brackets 68.

Figure 6:
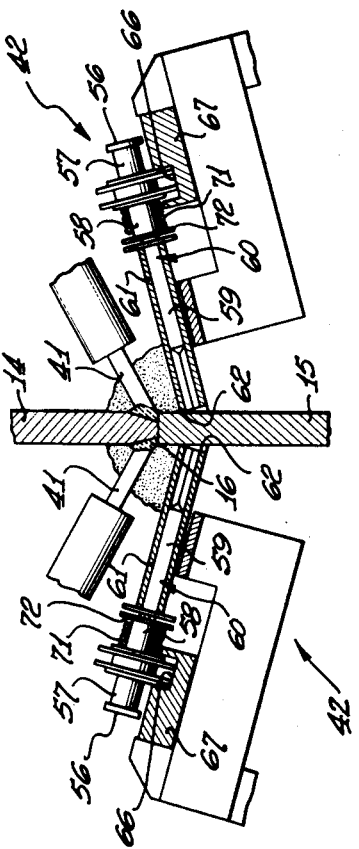
Figure 6 is a sectional detail taken substantially upon lines 6—6 as shown on Figure 1.

The belt segments 61 are slidably mounted on the projecting tips 59 of the pins 60 so that each belt segment may have individual lateral movement relative to the endless chain 44. Coil springs 71 encircle the intermediate portions 58 of the pins 60 and these coil springs act on the collars 72 in a direction to hold the belt segments 61 in contact with the plate 15. Some of the springs are compressed more than others in order that the end 62 of the belt segment 61 may conform to the curvature of the vertical plate 15. Thus, the flux support device 42 which lies on the concave side of the plate 15 operates with the belt segments 61 near the mid-point of the upper run 65 extended further from the chain than the segments at the ends of the run near the sprockets 45 and 46. Conversely, the belt segments on the convex side of the plate 15 are depressed near the center of the upper run 65 as compared to the belt segments at the ends of the upper run. The flux belt segments in overlapping position as shown in Figure 6 have substantially continuous contact with the plate 15 and provide a stable platform for supporting a layer of welding flux.

A hopper 73 for granular welding flux is provided on each side of the machine and is provided with a valve controlled discharge line 74 which deposits flux on the belt segments in advance of the welding electrode 41. Excess flux material is removed from the belt segments at a location rearward from the electrode 41 by means of a vacuum line 75 connected to the intake of the power driven blower 76. The blower returns the unused flux material to the hopper 73 by way of the pipe 77. The blower 76 and its driving motor 78 are mounted on the platform 11. Another motor 79 is also mounted on the platform 11 and drives a reduction gear 80 through a variable speed transmission 81. A chain drive 82 connects the reduction gear 83 in driving relationship with the grooved wheel 13.

The lateral spacing between columns 17 on opposite sides of the plates 14 and 15 is regulated by means of the adjustment screws 85 and 86. One end of each of these adjustment screws is threaded into a sleeve 87 and the other end into a block 88. The sleeve and block are connected by pivot pins to the upper ends of their respective columns 17. The columns 17 to which the blocks 88 are pivotally connected are mounted for limited pivotal movement on the platform 11; the other columns 17 are fixed rigidly to the platform 11. Lock nuts 89 are provided for locking the screws 85 and 86 in adjusted position.

In operation, the carriage or frame 10 rolls along the upper edge of the plate 14 under power supplied by motor 79. The endless chain 44 is driven by the variable speed motor 52 so that the upper run 65 of the chain is substantially stationary or moves very slowly relative to the plates 14 and 15. The overlapping belt segments 61 supported by the upper run 62 of the chain 44 extend downward at a small angle to contact the side surface of the lower plate 15 just below the seam 60. Granular welding flux is delivered through the discharge pipe 74 to form a layer on the belt segments in the path of the welding electrode 41. The welding head 38 operates to feed the consumable wire electrode 41 toward the seam 16 and the arc is submerged in the layer or blanket of welding flux supported by the overlapping belt segment 61. The speed of the drive motor 52 may be very accurately controlled by the operator and in this way the flux layer or blanket is held substantially stationary against the plates 14 and 15 or, if desired, may be caused to move very slowly in either direction relative to the plates.

In the modified form of my invention shown in Figures 8 and 9, a stationary bracket 100 is fixed to the beam 43 and is provided with upward extending lugs 101 and a central support post 102. A bracket 103 which includes the support plate 104, ears 105 and central fin 106 is mounted for pivotal movement on the bracket 100. As shown in the drawings, pivot pin 107 connects lugs 101 and ears 105, and clamp bolt 108 extends through aperture 109 in post 102 and through the arcuate slot 110 in fin 106. From this description it will be understood that the angularity of the support plate 104 may be adjusted by moving the fin 106 about the axis of the pivot pin 107. The clamp bolt 108 may then be used to secure the parts in adjusting position.

A plurality of laterally extending bolts 111 project through apertures provided in the plate 104 and engage nuts 112. Two of these nuts 112 are welded to the angle iron support 113 and the other two are welded to the guide rail 114 carried on posts 115 secured to the member 113. Coil springs 116 encircle the bolts 111 and extend between the plate 104 and the members 111 and 114. Bearings 117 and 118 are bolted on the angle iron support 113 and support the sprocket shafts 47a and 48a respectively. Sprockets 45a and 46a are fixed on the shafts 47a and 48a.

Endless chain 44a having pin connected links 54a and 55a is trained over the aligned sprockets. The chain pins 56a have a head end 60a which ride under and engage the surface 119 on the guide rail 114. The other ends of the pins 56a rest on the upper edge 120 of the rail 121 which is supported on the angle iron support 113 by means of brackets 122. Each of the links 54a and 55a is provided with a metallic plate 123 and each of the alternate links 54a is provided with a belt segment 61a formed of heat resistant flexible material. The length of the belt segments 61a in the direction of the upper run 65a of the chain 44a is substantially equal to twice the pitch of the chain, that is, twice the distance between the axes of the adjacent link pins 56a.

In operation, the upper projecting edges 62a of the belt segments 61a are brought into contact with the side surface of the plate 15, and the clamp bolt 108 is tightened to hold the upper surface of the belt segments in the desired angular position. The springs 116 permit relative lateral movement between the parts 113—114 and the support plate 104. In this form of my invention the individual belt segments do not have relative lateral movement toward and away from the plate 15. However, the flexibility of the end edges 62a of the belt segments 61a accommodates the curvature of the vertical plate 15, particularly where the radius of curvature is very large, such as is found in very large diameter storage tanks. The shaft 47a is driven from a variable speed motor as shown at 52 in the manner previously described.

The belt segments 61a cooperate to provide a support for welding flux and while the belt segments do not overlap along their side edges, the space between the side edges is kept at a minimum and the plates 123 on the links serve as back up supports for the major portion of the length of the links of the belt segments.

Having fully described my invention, it is to be understood that I do not wish to be limited to the details herein set forth, but my invention is of the full scope of the appended claims.

I claim:

1. For use with three o'clock welding apparatus for joining vertical plates along a horizontal seam by submerged arc welding, the improvement comprising: an endless flexible element having a portion thereof extending generally in the direction of the seam, a plurality of belt segments mounted for lateral movement on the endless flexible element and each having an edge portion adapted to contact one of the plates below the horizontal seam, the belt segments being cooperable to support a layer of welding flux adjacent the seam, and means for driving the endless flexible element.

2. For use with three o'clock welding apparatus for joining vertical plates along a horizontal seam by submerged arc welding, the improvement comprising: an endless flexible element having a portion thereof extending generally in the direction of the seam, a plurality of belt segments mounted for lateral movement on the endless flexible element and each having an end edge portion adapted to contact one of the plates below the horizontal seam, the belt segments having overlapping side edges and being cooperable to support a layer of welding flux adjacent the seam, and means for driving the endless flexible element.

3. For use with three o'clock welding apparatus for joining vertical plates along a horizontal seam by submerged arc welding, the improvement comprising: an endless flexible element having a portion thereof extending generally in the direction of the seam, a plurality of belt segments mounted for lateral movement on the endless flexible element and each having an edge portion adapted to contact one of the plates below the horizontal seam, the belt segments being cooperable to support a layer of welding flux adjacent the seam, resilient means acting to move the belt segments laterally into plate-contacting position, and means for driving the endless flexible element.

4. For use with three o'clock welding apparatus for joining vertical plates along a horizontal seam by submerged arc welding, the improvement comprising in combination: an endless chain having a run thereof extending generally in the direction of the seam, belt segments mounted on the chain for lateral movement relative thereto, each belt segment having an edge portion adapted to contact one of the plates below the horizontal seam, the belt segments being cooperable to support a layer of welding flux against the latter said plate, and means for driving the endless chain.

5. For use with three o'clock welding apparatus for joining vertical plates along a horizontal seam by submerged arc welding, the improvement comprising in combination: an endless chain having a run thereof extending generally in the direction of the seam, belt segments mounted on the chain for lateral movement relative thereto, each belt segment having an edge portion adapted to contact one of the plates below the horizontal seam, the belt segments being cooperable to support a layer of welding flux against the latter said plate, resilient means acting to move the belt segments laterally into plate-contacting position, and means for driving the endless chain.

6. For use with three o'clock welding apparatus for joining vertical plates along a horizontal seam by submerged arc welding, the improvement comprising in combination: an endless chain having a run thereof extending generally in the direction of the seam, the chain having links connected by parallel pins, belt segments slidably mounted on the pins and each having an edge portion adapted to contact one of the plates below the horizontal seam, the belt segments being cooperable to support a layer of welding flux against the latter said plate, and means for driving the endless chain.

7. For use with three o'clock welding apparatus for joining vertical plates along a horizontal seam by submerged arc welding, the improvement comprising in combination: an endless chain having a run thereof extending generally in the direction of the seam, the chain having links connected by parallel pins, belt segments slidably mounted on the pins and each having an edge portion adapted to contact one of the plates below the horizontal seam, the belt segments being cooperable to support a layer of welding flux against the latter said plate, resilient means acting to move the belt segments axially of the pins into plate-contacting position, and means for driving the endless chain.

8. For use with three o'clock welding apparatus for joining vertical plates along a horizontal seam by submerged arc welding, the improvement comprising in combination: an endless chain having an upper run thereof extending generally in the direction of the seam, the chain having links connected by parallel pins, belt segments movably mounted on the pins and each having an end edge portion adapted to contact one of the plates below the horizontal seam, the belt segments having overlapping side edges and being cooperable to support a layer of welding flux against the latter said plate, resilient means acting to move the belt segments axially of the pins into plate-contacting position, and means for driving the endless chain.

9. For use with three o'clock welding apparatus for joining vertical plates along a horizontal seam by submerged arc welding, the improvement comprising in combination: an endless chain having an upper run thereof extending generally in the direction of the seam, the chain having links connected by parallel pins, belt segments movably mounted on pairs of adjacent pins and each having an end edge portion adapted to contact one of the plates below the horizontal seam, the belt segments having overlapping side edges and being cooperable to support a layer of welding flux against the latter said plate, spring means acting to move the belt segments axially of the pins into plate-contacting position, and means for driving the endless chain.

10. For use with three o'clock welding apparatus for joining vertical plates along a horizontal seam by submerged arc welding, the improvement comprising: an endless flexible chain having an upper run thereof extending generally in the direction of the seam, aligned sprockets supporting the chain, laterally extending members on said endless flexible chain, a plurality of belt segments mounted on said members and each having an edge portion adapted to contact one of the plates below the horizontal seam, the belt segments being cooperable to support a layer of welding flux adjacent the seam, and power means for driving one of the sprockets.

11. For use with three o'clock welding apparatus for joining vertical plates along a horizontal seam by submerged arc welding, the improvement comprising, in combination: an endless chain having an upper run thereof extending generally in the direction of the seam, the chain having links, laterally extending belt segments each mounted on a link of the chain and each having an end edge portion adapted to contact one of the plates below the horizontal seam, the belt segments on the upper run of the chain being cooperable to support a layer of welding flux against the latter said plate, and power means for driving one of the sprockets.

12. For use with three o'clock welding apparatus for joining vertical plates along a horizontal seam by submerged arc welding, the improvement comprising in combination: an endless chain having an upper run thereof extending generally in the direction of the seam, belt segments mounted on the chain and each having an end edge portion adapted to contact one of the plates below the horizontal seam, the belt segments cooperating to support a layer of welding flux against the latter said plate, sprockets supporting the chain, a guide for the upper run of the chain, common support means for the sprockets and guide, and means for tilting the common support about an axis substantially parallel to the upper run of the chain.

13. For use with three o'clock welding apparatus for joining vertical plates along a horizontal seam by submerged arc welding, the improvement comprising in combination: an endless chain having an upper run thereof extending generally in the direction of the seam, the chain having links, belt segments mounted on links of the chain and each having an end edge portion adapted to contact one of the plates below the horizontal seam, the belt segments cooperating to support a layer of welding flux against the latter said plate, sprockets supporting the chain, a guide for the upper run of the chain, means including laterally extending springs for supporting the sprockets and the guide, and means for tilting the sprockets and guide about an axis substantially parallel to the upper run of the chain.

References Cited in the file of this patent

UNITED STATES PATENTS

| 857,292 | Machlet | June 18, 1907 |
| 2,529,812 | Peters | Nov. 14, 1950 |
| 2,638,524 | Meyer | May 12, 1953 |
| 2,713,106 | Arnold | July 12, 1955 |
| 2,755,367 | Costello | July 17, 1956 |